US011456682B2

(12) United States Patent
Hoesli

(10) Patent No.: US 11,456,682 B2
(45) Date of Patent: Sep. 27, 2022

(54) OSCILLATORY DRIVE UNIT

(71) Applicant: MINISWYS SA, Biel (CH)

(72) Inventor: Raphaël Yann Hoesli, Nidau (CH)

(73) Assignee: MINISWYS SA, Biel (CH)

( * ) Notice: Subject to any disclaimer, the term of this patent is extended or adjusted under 35 U.S.C. 154(b) by 288 days.

(21) Appl. No.: 16/753,168

(22) PCT Filed: Oct. 2, 2018

(86) PCT No.: PCT/EP2018/076790
§ 371 (c)(1),
(2) Date: Apr. 2, 2020

(87) PCT Pub. No.: WO2019/068708
PCT Pub. Date: Apr. 11, 2019

(65) Prior Publication Data
US 2020/0252007 A1 Aug. 6, 2020

(30) Foreign Application Priority Data
Oct. 4, 2017 (EP) ..................................... 17194747

(51) Int. Cl.
*H02N 2/00* (2006.01)
*H02N 2/10* (2006.01)
(52) U.S. Cl.
CPC ............. *H02N 2/001* (2013.01); *H02N 2/006* (2013.01); *H02N 2/0095* (2013.01); *H02N 2/103* (2013.01)
(58) Field of Classification Search
CPC ...... H02N 2/001; H02N 2/006; H02N 2/0095; H02N 2/103
See application file for complete search history.

(56) References Cited

U.S. PATENT DOCUMENTS

| 6,201,339 | B1 | 3/2001 | Tani et al. |
| 6,768,245 | B2 | 7/2004 | Mock et al. |
| 7,429,812 | B2 | 9/2008 | Witteveen |
| 2002/0038987 | A1* | 4/2002 | Magnussen ......... H01L 41/0906 310/323.16 |
| 2015/0180448 | A1* | 6/2015 | Ichikawa ............. H03H 9/1014 310/370 |
| 2017/0052386 | A1 | 2/2017 | Siegrist et al. |

FOREIGN PATENT DOCUMENTS

| EP | 2 824 824 | 1/2015 |
| JP | 63-294279 | 11/1988 |

OTHER PUBLICATIONS

Suzuki et al., "Development of a new type of piezoelectric micromotor", Sensors and Actuators, May 22, 2000, vol. 83, No. 1-3, pp. 244-248; cited in International Search Report.

* cited by examiner

*Primary Examiner* — Emily P Pham
(74) *Attorney, Agent, or Firm* — Rankin, Hill & Clark LLP

(57) ABSTRACT

A piezoelectric drive unit is configured for driving a passive element relative to an active element, wherein the active element includes a resonator with two arms, each extending in parallel to a reference plane and ending in a contact element, which is movable by oscillating movements of the arms and thereby drives the passive element. A pre-stress element is arranged to exert a relative force between the active element and passive element, pressing them against one another with pre-stress forces that are normal to the reference plane.

16 Claims, 3 Drawing Sheets

OSCILLATORY DRIVE UNIT

BACKGROUND OF THE INVENTION

Field of the Invention

The invention relates to the field of oscillatory drives.

Description of Related Art

U.S. Pat. No. 6,768,245 B1 discloses a piezoelectric motor, with which a drive element, including a piezo element and contact elements, is elastically suspended, and by the piezo element is set into oscillations for driving a further body or passive element, by way of the contact elements.

U.S. Pat. No. 7,429,812 B1 discloses a piezoelectric drive unit with a resonator, includes at least two arms, arranged to extend from the same side of the resonator. Contact elements are located at the outer ends of the arms, and can be moved together or apart by way of oscillating movements of the arm pair, by which means a relative movement of a passive element with respect to an active element carrying the resonator can be effected. The passive element can be made to be elastic in itself. Alternatively or in addition, the passive element can be elastically supported relative to the arm pair. These measures allow to transfer the oscillating movement and resulting forces exerted by the two arms in an efficient manner, and/or to compensate for imperfect alignment of the parts.

JP S63 294279 A shows a piezoelectric drive in which a pair of arms drives an object that is arranged laterally to the direction of the arms, in parallel to but distanced from a plane in which the arms lie.

EP 2 824 824 A1 shows a similar arrangement, with an oscillating comb-like structure of arms, with a driven object arranged laterally from the structure of arms.

U.S. Pat. No. 6,201,339 shows a piezoelectric drive in which a driven rotating plate lies in parallel to a set of arms that are roughly parallel to the plate and are pressed against the plate.

U.S. Pat. No. 7,429,812 B2 shows various arrangements of piezoelectric drives with parallel arms acting on a driven object.

There is a need to simplify construction of such an oscillating drive unit, which can help to reduce manufacturing complexity and costs, and increase reliability.

SUMMARY OF THE INVENTION

It is therefore an object of the invention to create a drive unit of the type mentioned initially, which overcomes the disadvantages mentioned above.

Thus, the drive unit is configured for driving a passive element relative to an active element, wherein the active element includes a resonator with two arms, each extending in parallel to a reference plane and ending in a contact element, which is movable by oscillating movements of the arms, and thereby drives the passive element. A pre-stress element is arranged to exert a relative force between the active element and passive element, pressing them against one another with pre-stress forces that are normal to the reference plane.

Stated in more detail: the drive unit is configured for driving a passive element relative to an active element, wherein the active element includes:

a resonator and at least one excitation means for exciting oscillations in the resonator, the resonator including at least two arms, extending from a connection region of the resonator at the same side of the connection region, the resonator and the arms extending in parallel to a reference plane, each of the arms comprising, at an outer end of the arm, a contact element, the contact elements being movable by way of oscillating movements of the arms, the passive element being arranged to be driven and moved relative to the active element by way of these oscillating movements;

the passive element includes contact areas, each contact area being arranged to be in contact with a respective one of the contact elements.

Therein, a pre-stress element is arranged to exert a relative force between the active element and passive element, whereby each contact area is pressed against the respective contact element with a pre-stress force that has a component that is normal to the reference plane.

Each arm extending from the connection region can be said to be connected to the connection region at a proximal end of the arm, and its contact element is arranged at a distal end of the arm. The direction in which the arms extend corresponds to a resonator axis. The resonator with the excitation means and without the arms can be mirror-symmetric with regard to the resonator axis, e.g., when seen in a projection onto the reference plane. The resonator including the arms can be substantially mirror-symmetric with regard to the resonator axis. But there can be a slight asymmetry in that the midpoint between the arms can be shifted to one side (seen in the reference plane).

The oscillating movements of the arms can cause the contact elements to move towards one another and away from another, which can be the result of each contact element moving along an elliptical path. Movement of each path can be clockwise or counterclockwise (seen in the plane of the resonator), and can be controlled by adjusting an excitation frequency of the excitation means. The excitation means typically is a piezoelectric element. Further details of such drives are described in the initially cited U.S. Pat. No. 6,768,245 B1 and U.S. Pat. No. 7,429,812B1.

A force vector having a component normal to the reference plane can mean that an angle between the vector and the reference plane is at least 10° or at least 20° or at least 30° or at least 40°.

A contact element (part of the active element) touches the contact body (part of the passive element) at contact areas. Contact forces related to the pre-stress will be generally normal to the contact surfaces where the parts touch, and in particular normal to a contact surface in the contact area, in particular normal to a tangent plane thereof.

In embodiments, a normal vector to a plane that is tangent to the surface of the contact body in its contact area will have an angle to the reference plane that is at least 10° or at least 20° or at least 30° or at least 40°.

In embodiments, the resonator includes a first surface and an opposed second surface, both parallel to the reference plane, and the first contact area and second contact area are arranged to come into contact only with contact edges of the contact regions, the contact edges being located where the contact regions, are adjacent to the first and second surface, respectively.

In embodiments
the first contact region comprises, where it is adjacent to the first surface, a first contact edge of the first arm, and where it is adjacent to the second surface, a second contact edge of the first arm, and the second contact region comprises, where it is adjacent to the first surface, a first contact edge of the second arm, and where it is adjacent to the second surface, a second contact edge of the second arm.

Then, one of the following can be the case:

The first contact area is in contact with only the first contact edge of the first arm, and the second contact area is in contact with only the first contact edge of the second arm.

The first contact area is in contact with only the first contact edge of the first arm, and the second contact area is in contact with only the second contact edge of the second arm.

It is understood that being in contact means being in contact intermittently during operation of the drive unit, as the oscillating arms intermittently are in contact and move away from the respective areas on the contact body.

In embodiments, the pre-stress element is attached to the resonator, in particular by being shaped as a single part with the resonator, and arranged to press against the passive element in a direction normal to the reference plane.

In embodiments, the pre-stress element is formed by a further active element, in particular in a mirror-symmetric arrangement with the active element.

In embodiments, the resonators of the further active element and the active element are manufactured in one piece. For example, they can be manufactured from a single piece of sheet material, for example, from a sheet of metal.

In embodiments, the pre-stress element is part of a suspension of the active element, or part of a suspension of the passive element, or part of both.

For example, the active element can be mounted to a base element through an attachment (or suspension, or mounting) element, which can be resilient or elastic. Likewise, the passive element can be mounted to (or attached to, or suspended on) a driven part through a link which can be resilient or elastic. A mechanical linkage between the passive element and the active element can then be such that when the contact body is arranged between the arms, the attachment element and/or the link are elastically deformed. Such an elastic deformation corresponds to the pre-stress forces between the contact elements and the contact body.

In embodiments, the passive element is arranged to rotate around a rotary movement axis, the rotary movement axis being normal to the reference plane In embodiments, the component of the pre-stress force acting between the first contact area and of the first contact element that is normal to the reference plane and the component of the pre-stress force acting between the second contact area and the second contact element that is normal to the reference plane are in the same direction.

Consequently, if the rotary movement axis is normal to the reference plane, the normal components (relative to the reference plane) of the pre-stress forces acting between each of the contact areas and the respective contact element are parallel to the rotary movement axis.

In embodiments, a further active element is present, and the contact body is rotationally symmetric with respect to a rotary movement axis, with a diameter that varies along this axis, and the first contact area and second contact area are located at a region along the axis where the diameter increases.

In embodiments, a further active element is present, and the contact body when considered along the rotary movement axis includes a first section where the diameter increases and which is in contact with the arms of the active element, and a second section where the diameter decreases and which is in contact with the arms of the further active element.

The active element can drive the passive element at the first section, and the further active element can drive it at the second section.

In embodiments, the passive element is arranged to rotate around a rotary-linear movement axis, between two active elements, the rotary-linear movement axis being essentially parallel to their resonator axes, and lying in the plane of symmetry of the mirror-symmetric arrangement of the two active elements.

In embodiments, the passive element is arranged to translate along a linear movement axis, the linear movement axis being parallel to the reference plane, and in particular also parallel to the resonator axis.

In embodiments, the pre-stress force acting between the first contact area and the first contact element and the pre-stress force acting between the second contact area and the second contact element are parallel and in opposite directions.

Consequently, in this case, the pre-stress forces correspond to a torque acting on the contact body. An axis of this torque typically is parallel to or coincident with the linear movement axis.

In embodiments, the pre-stress force effects a bending of a link that extends in a direction normal to the resonator axis.

In embodiments, the pre-stress force effects a twisting of a link that extends in parallel to the resonator axis.

In a method for operating the drive unit, the excitation means is supplied with an electrical voltage at different frequencies, thereby generating different movement patterns of the arms and the contact regions, according to the frequency. Different movement patterns cause the passive element to rotate and/or move linearly, according to a degree of freedom defined by a suspension of the passive element relative to the active element.

A drive unit, according to a further aspect of the invention, includes a bearing element that provides an additional contact at which the active element can support and stabilise the passive element.

Stated in more detail: the drive unit according to the further aspect of the invention is configured for driving a passive element relative to an active element, wherein the active element includes:

a resonator and at least one excitation means for exciting oscillations in the resonator, the resonator including at least two arms extending from a connection region of the resonator at the same side of the connection region, the resonator and the arms extending in parallel to a reference plane, each of the arms comprising, at an outer end of the arm, a contact element, the contact elements being movable by way of oscillating movements of the arms, the passive element being arranged to be driven and moved relative to the active element by way of these oscillating movements;

the passive element includes contact areas, each contact area being arranged to be in contact with a respective one of the contact elements.

Therein, the resonator includes a bearing element arranged to contact the contact body at a third contact area.

Such a drive unit according to the further aspect can be implemented having a pre-stress element as presented in the abovementioned embodiments, or without such a pre-stress element being present.

Such a drive unit allows for a larger diameter of the contact body, as compared to a drive without the bearing element, and thereby for a larger torque to be applied between the active element and the passive element.

In embodiments according to the further aspect, the bearing element is manufactured as a single piece with the resonator.

In embodiments according to the further aspect, the bearing element lies at least approximately on the resonator axis.

In embodiments according to the further aspect, the passive element is arranged to rotate around a rotary movement axis, the rotary movement axis being normal to the reference plane In embodiments according to the further aspect, the locations of the two contact elements and the bearing element define a triangle, and the rotary movement axis passes through this triangle.

Throughout the present text, where parts are manufactured from a single piece of sheet material, for example, from a sheet of metal, this can done by a subtractive process, such as cutting or stamping or etching.

BRIEF DESCRIPTION OF THE DRAWINGS

The subject matter of the invention will be explained in more detail in the following text with reference to exemplary embodiments which are illustrated in the attached drawings, which schematically show:

FIG. 9 a kinematic arrangement representing the different embodiments; and.

FIG. 10 a drive with an active element having a bearing element.

DETAILED DESCRIPTION OF THE INVENTION

In principle, identical parts are provided with the same reference symbols in the figures.

Figure 1:
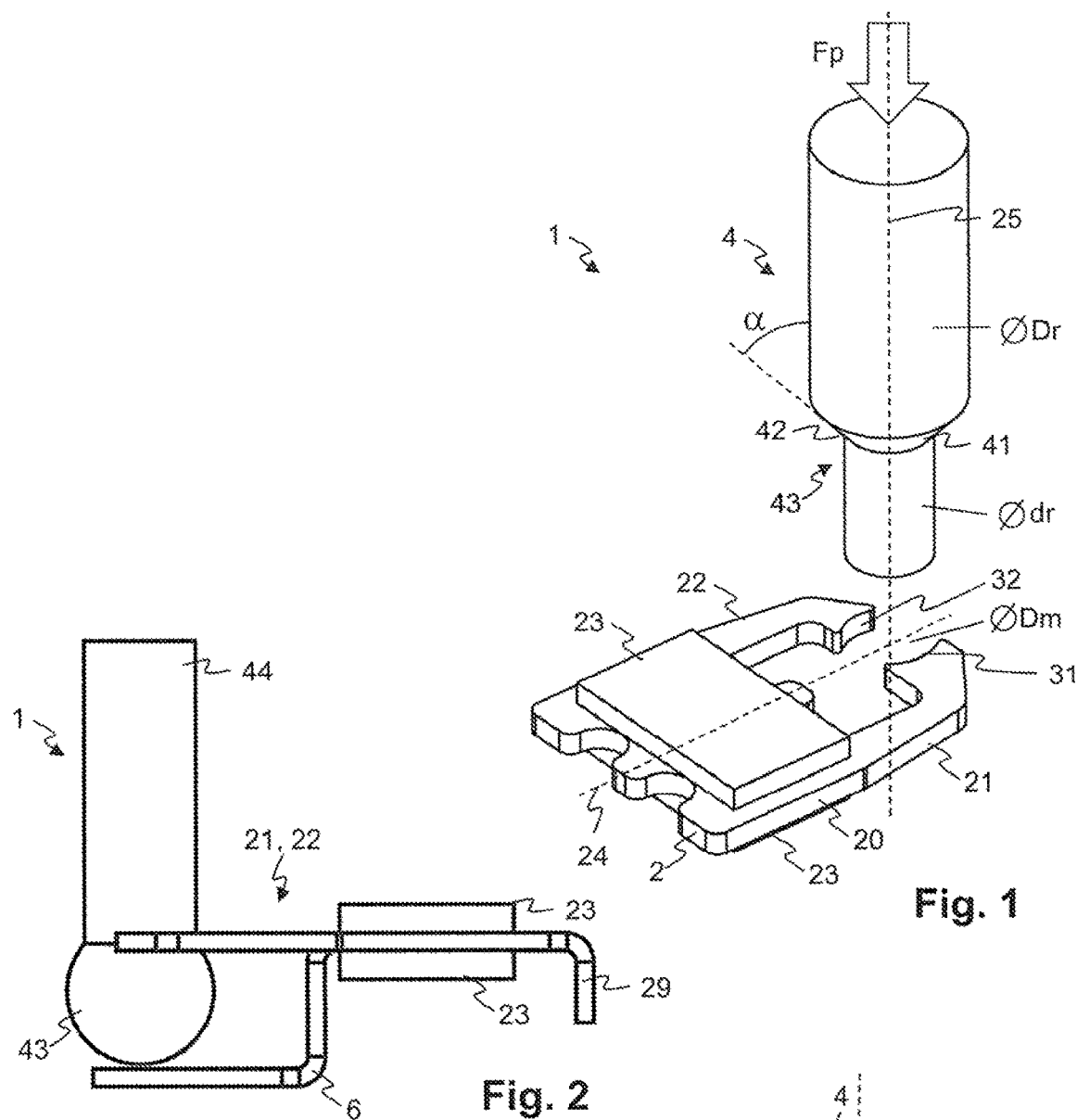
FIG. 1 elements of a drive unit.

FIG. 1 schematically shows, in an exploded view, elements of a drive unit, with an active element 1 and a passive element 4. The active element 1 includes a resonator 2 or resonator plate 2 and two excitation means 23. From a connection region 20 of the resonator 2, a first arm 21 and second arm 22 extend in the same direction, corresponding to a resonator axis 24. At the end of each arm there are respective first contact elements 31 and second contact elements 32, designed to contact and move the passive element 4 by means of contacting first contact areas 41 and second contact areas 42 of the passive element 4. These contact areas are not necessarily in a fixed relation to the moving passive element 4, rather they are the locations where the contact regions 31, 32 currently contact the passive element 4, as the passive element 4 rotates about a rotary movement axis 25 (in FIG. 1) or translates (in other embodiments) relative to the active element 1.

As explained in U.S. Pat. No. 7,429,812 B1 cited above, an excitation frequency of a voltage generator driving the excitation means 23, which can be a piezoelectric element, can be varied, and depending on the frequency different modes of mechanical oscillations of the arms will be generated. For example, in one mode the contact regions 31, 32 will—seen in a projection onto the reference plane—both rotate clockwise, in another both will rotate counterclockwise, and in another one will rotate clockwise and the other one counterclockwise. Depending on the suspension of the passive element, i.e. rotary or linear or combined rotary-linear, the passive element will move accordingly.

As opposed to the prior art, the passive element 4 is pressed against the active element 1 such that contact forces arising at the contact regions 31, 32 are normal to a reference plane 28. The reference plane 28 is parallel to the resonator 2.

In the embodiment of FIG. 1, the passive element 4 is pressed towards the active element 1 with a force Fp normal to the reference plane 28. The resulting forces arising at the contact regions 31, 32 arise at contact edges, where the contact regions 31, 32 contact a section of a contact body 43 passive element 4 where the diameter of the passive element 4 increases from a smaller diameter dr to a larger diameter Dr, and thus the contact body 43 can exert a force against the contact regions 31, 32 in a direction normal to the reference plane 28 and parallel to the rotary movement axis 25, which also is an axis of symmetry of the passive element 4. This force corresponds to components Fnz of contact forces Fn acting between the contact regions 31, 32 and the first contact area 41 and second contact area 42. These forces Fn are directed at an angle α to the reference plane 28.

A diameter Dm corresponding to a distance between the contact regions 31, 32 lies within these two diameters dr, Dr. Typically therefore only the contact edges, shown in more detail in FIG. 5, come into contact with the passive element 4, and not the parts of the surface of the resonator 2 that are normal to the resonator plane.

Figure 2:
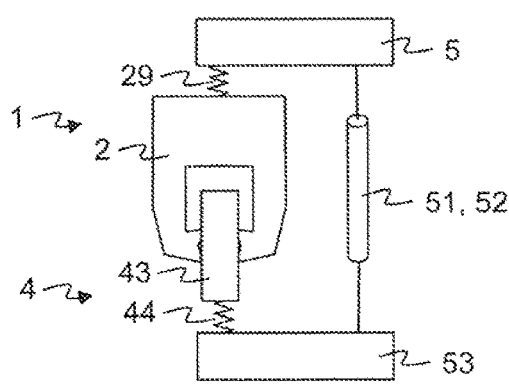
FIG. 2 a drive unit with a pre-stress element attached to the active element.
Figure 5:
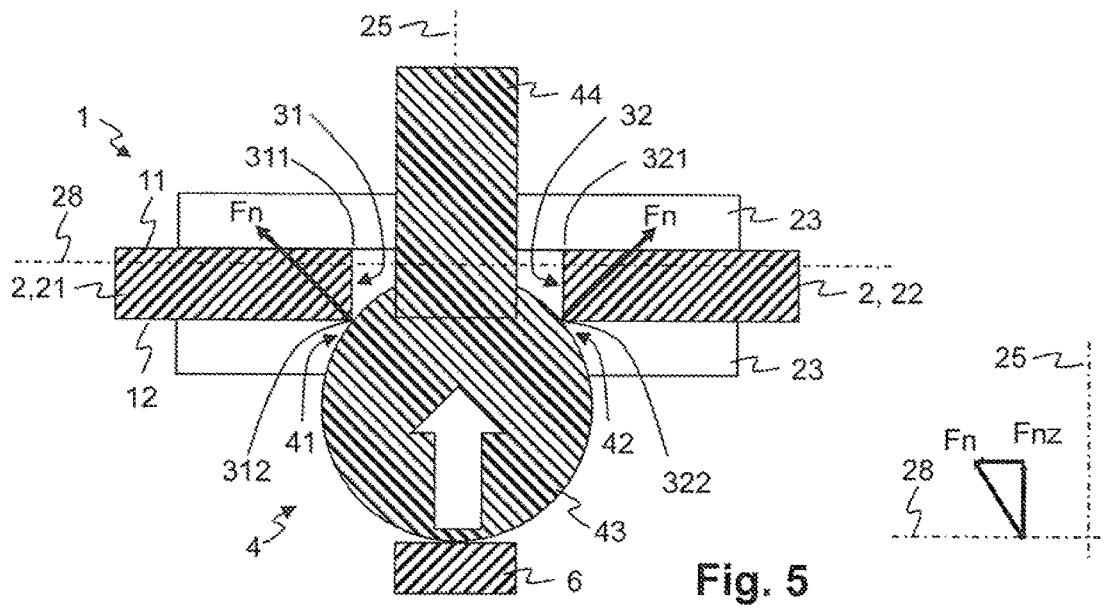
FIG. 5 a cross section showing contact edges in more detail, with a passive element in contact with edges at the same side of the active element.

FIG. 2 shows a drive unit with a pre-stress element 6 attached to the active element. The pre-stress element 6 exerts the force Fp mentioned above. The contact body 43 is clamped between the pre-stress element 6 and the contact regions 31, 32, that is, the contact edges of the contact regions 31, 32 as shown in FIG. 5. The pre-stress element 6 can be manufactured in a single piece with the resonator 2, e.g. with the piece being bent from a region of an attachment element 29 towards the contact body 43. Alternatively, the pre-stress element 6 or can be attached to the resonator 2, e.g. by welding, gluing, etc. The attachment element 29 can be used, as in the other embodiments, to attach the resonator 2 to a base element 5.

Figure 3:
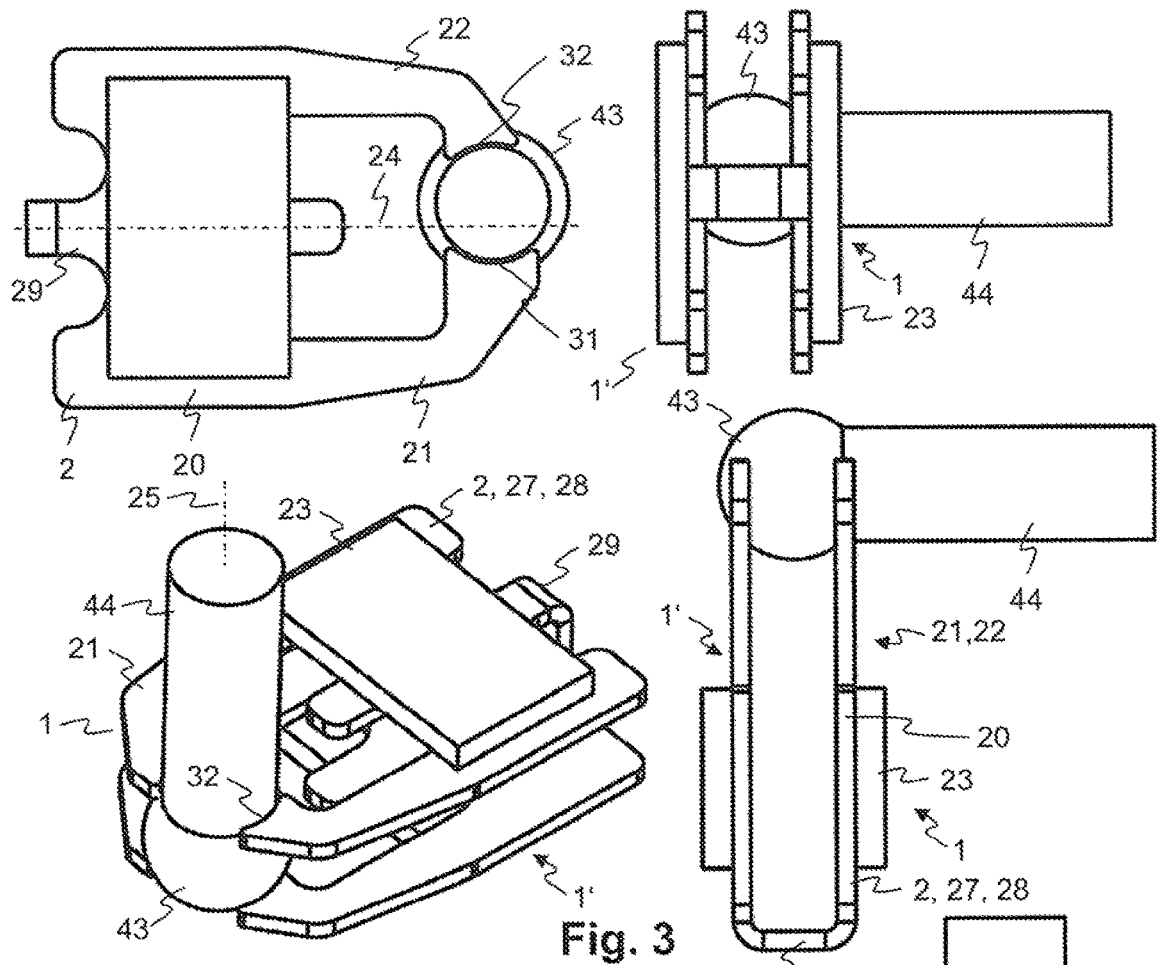
FIG. 3 a drive unit with two active elements, arranged to rotate a passive element.

FIG. 3 shows a drive unit with two active elements, that is, an active element 1 (or first active element 1) and a further active element 1', arranged to rotate a passive element, in four different views. The two active elements 1, 1' are essentially of the same construction as those of FIGS. 1 and 2, except that each of them includes only a single excitation means 23.

The further active element 1' acts as the pre-stress element 6 for the active element 1 and vice versa. An attachment element 29 which in this case joins the two active elements acts as a spring pushing the arms of the two active elements towards one another. This also is the case for the embodiment of FIG. 4.

The contact body 43 and a cylindrical link 44 are, seen in the reference plane 28, held between the arms of the two active elements 1, 1'. Thereby, movement of the passive element 4 is constrained to a rotation about its rotary movement axis 25, substantially normal to the reference plane 28 of the two active elements 1, 1' that is, their respective resonators 2.

The two active elements 1, 1' can be manufactured with their resonators 2 made from the same piece of material in one piece. In particular, they can be manufactured from the same piece of sheet material, such as a piece of sheet metal. This also is the case for the embodiment of FIG. 4.

The two excitation means 23 can be driven by the same voltage signal with the same excitation frequency, or at different frequencies.

Figure 4:
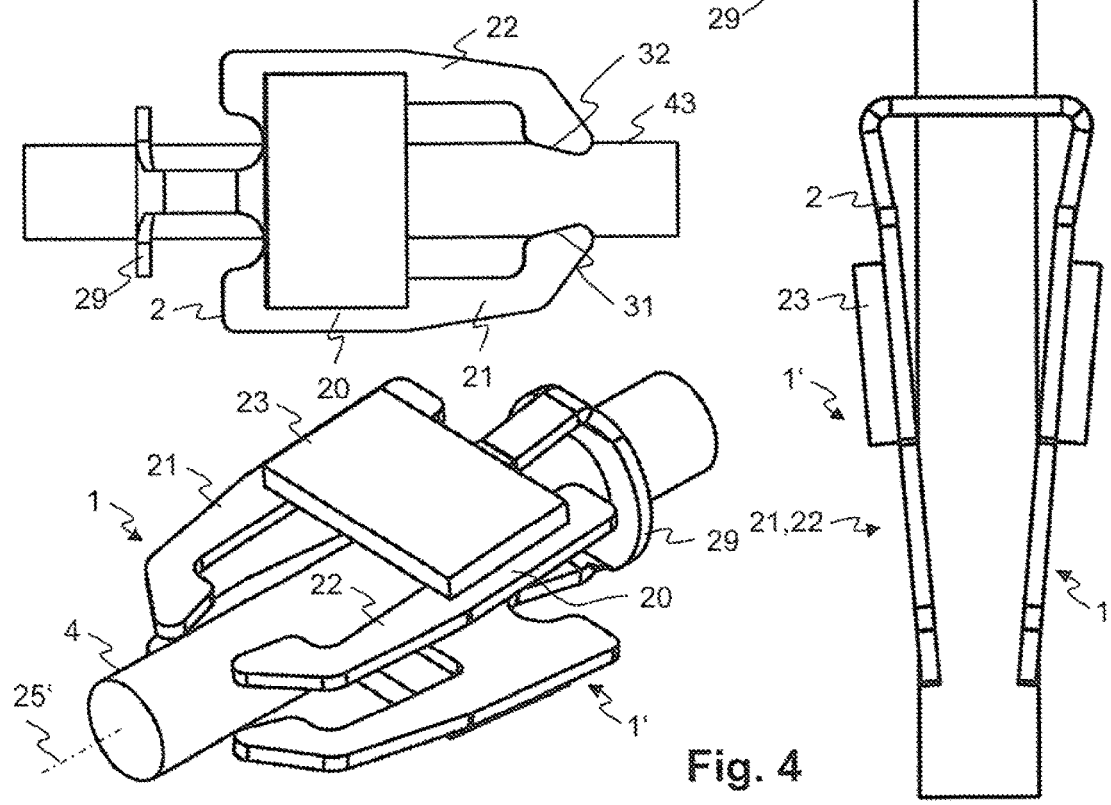
FIG. 4 a drive unit with two active elements, arranged to rotate and/or linearly displace the passive element.

FIG. 4 shows a drive unit with two active elements, that is, an active element 1 (or first active element 1) and a further active element 1', arranged to rotate and/or linearly displace the passive element, in three different views. The construction is similar to that of the embodiment of FIG. 3, except for the orientation of the passive element 4: The passive element 4 is cylindrical, with a rotary-linear movement axis 25', and is held between the arms of the two active elements 1, 1' and in an opening formed in the attachment element 29 joining the two active elements 1, 1'. Movement of the passive element 4 is constrained to a rotation about rotary-linear movement axis 25', substantially parallel to the reference planes 28 of the two active elements 1, 1', or to a bisecting plane of these two reference planes 28.

FIG. 5 shows a cross section showing contact edges in more detail, with a passive element 4 in contact with edges at the same side of the active element 1. The cross section corresponds to the embodiment of FIG. 2. The diameter of the link 44 is shown to be clearly smaller than an inner diameter defined by the contact regions 31, 32. This gives the rotary axis 25 of the passive element a certain freedom of movement, which allows for the rotary movement axis 25 to be not parallel to a virtual axis going through the diameter determined by the diameter of the contact regions 31, 32. In other words, the axis 25 must not necessarily be normal to the reference plane 28 of the active element. In other embodiments, the diameter of the link 44 can be only slightly smaller than the inner diameter between the contact regions 31, 32, in order to guide and stabilise the rotary movement axis 25. The situation regarding the edges is the same in the embodiments having two active elements 1, 1', with the further active element 1' mirroring the (first) active element 1. The resonator 2 has an first surface 11 and a second 12 parallel to one another and to the reference plane 28. Each of the first arm 21 and second arm 22 has a respective first contact element 31 and second contact element 32 at its end, facing the passive element 4. Where the first contact element 31 is adjacent to the first and second surface 11, 12, it includes a first contact edge of the first arm 311 and second contact edge of the first arm 312, respectively. In the same way, the second contact element 32 includes a first contact edge of the second arm 321 and second contact edge of the second arm 322. Because of the variation of diameter in the contact body 43, only the second contact edge of the first arm 312 and the second contact edge of the second arm 322 are in contact with the contact body 43. This defines corresponding first contact areas 41 and second contact areas 42 on the contact body 43. As already explained, the variation in diameter of the contact body 43 allows the passive element 4 to be pushed against the active element 1, by means of the pre-stress element 6, giving rise to contact forces normal to the reference plane 28. The force exerted by the pre-stress element 6 is shown by a block arrow.

Figure 6:
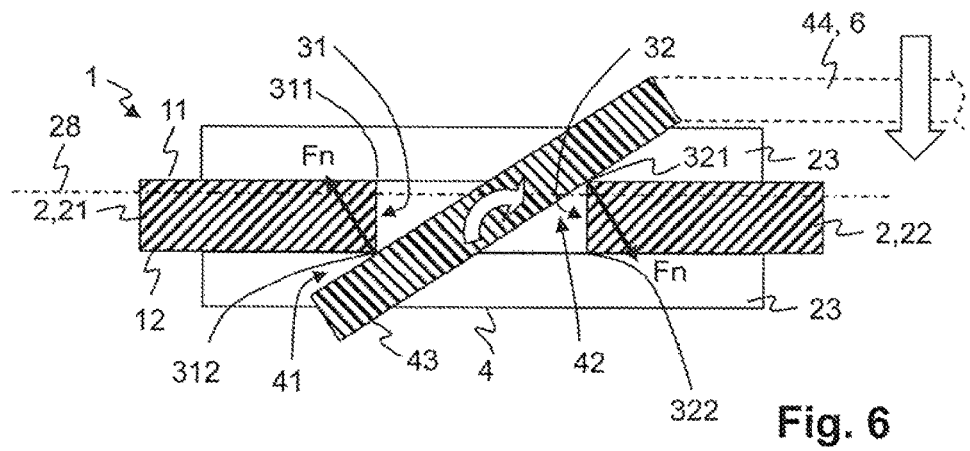
FIG. 6 a cross section showing contact edges in more detail, with a passive element in contact with edges at the opposite side of the active element.

FIG. 6 shows a cross section showing contact edges in more detail, with a passive element 4 in contact with edges at the opposite side of the active element 1. The situation with regard to the active element 1 is the same as in FIG. 5. The passive element 4 includes a contact body 43 in the shape of a plate, inclined with regard to the reference plane 28 and arranged to contact the second contact edge of the first arm 312 and the first contact edge of the second arm 321, that is, contact edges at opposite sides of the resonator 2 (relative to the reference plane 28). The forces at the contact edges are induced by a torque acting on the contact body 43, shown by a block arrow. This torque in turn is generated by a force, also shown as a block arrow, acting on a link 44 joining the contact body 43 to a driven part 53, not shown. The link 44 extends in a direction substantially normal to the resonator axis 24. The link 44 itself can be resilient, thereby acting as the pre-stress element 6. For this, the link 44 can be elastically bent around the resonator axis 24. A linear joint 52 between the driven part 53 and a base element 5 carrying the active element 1 defines a linear movement axis 26. This linear movement axis 26 is substantially parallel to the resonator axis 24 of the active element 1. Consequently, the link 44 extends substantially normal to this linear movement axis 26.

FIGS. 5 and 6 both show force vectors acting between the contact elements 31, 32 and the first contact area 41 and second contact area 42. Only one vector Fn, representing the force acting on the respective contact element 31, 32 is shown in each case for clarity, while the opposing force acting on the contact body 43 is omitted. Typically, the forces Fn are normal to the first contact area 41 or second contact area 42, or, in three dimensions, normal to a plane that is tangent to the respective contact area. Each force vector Fn has a component Fnz in a direction that is normal to the reference plane 28. The angle between the force vector Fn and the reference plane is at least 10° or at least 20° or at least 30° or at least 40°.

In the case of the rotating contact body 43 of FIG. 5, the respective components Fnz also are in the direction of the rotary movement axis 25. The components Fnz of the two contact forces have the same sign.

In the case of the flat contact body 43 of FIG. 6 contacting the arms at opposite sides, the components Fnz of the two contact forces have the opposite sign. Furthermore, assuming that the first contact area 41 and second contact area 42 have parallel but opposed surfaces, the vectors Fn point in opposite directions.

The figures show the contact elements 31, 32 having edges with right angles. Generally, the edges of the active element can be rounded or chamfered, in particular, they can be shaped to match the shape of the contact body 43. This decreases the abrasive wear of both elements.

Figure 7:
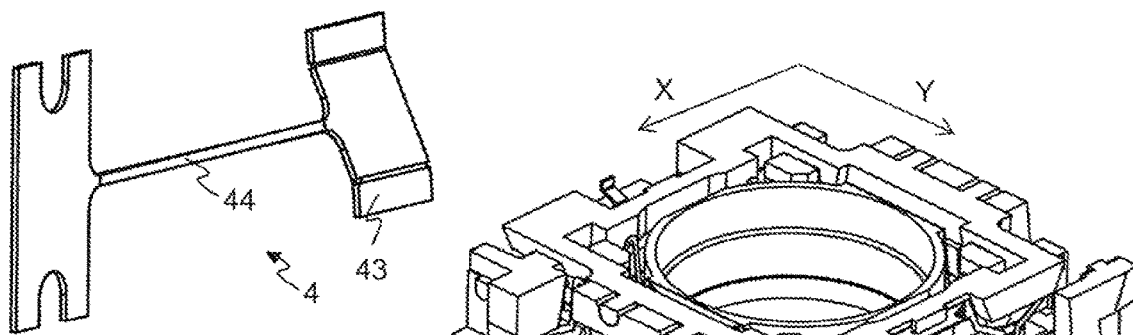
FIG. 7 a passive element with a suspension designed to be twisted.

FIG. 7 shows a passive element 4 with a suspension link 44 designed to be twisted. The arrangement of the contact body 43 with respect to the active element 1, and the definition of the linear movement axis 26 can be as in FIG.

6. The difference is that the link 44 runs substantially parallel to the resonator axis 24 and the linear movement axis 26. The link 44 itself can be resilient, thereby acting as the pre-stress element 6. For this, the link 44 can also be elastically twisted around the resonator axis 24.

Figure 8:
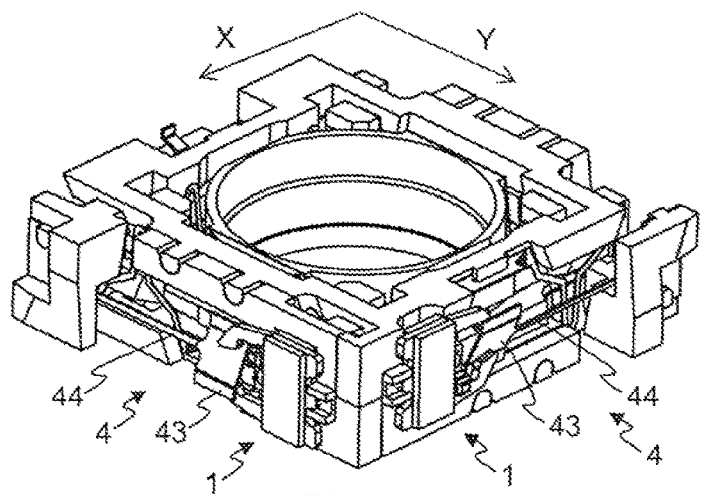
FIG. 8 an application including two drive units with passive elements as in FIG. 7.

FIG. 8 shows an application including two drive units with passive elements 4 as in FIG. 7. The drive units can be arranged to move a driven part 53, suspended to be able to move in an X and Y direction in the plane, independently in these two directions. Corresponding suspensions are disclosed in US 2017/052386 A1.

Figures 9, 10:
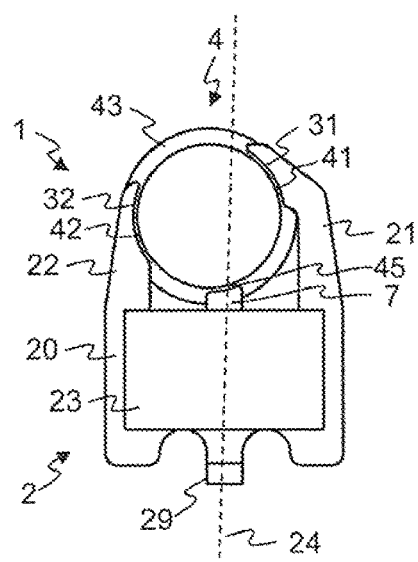

FIG. 9 shows, in a highly schematic manner, a possible kinematic arrangement representing the different embodiments, except for the one in which the pre-stress element 6 is connected to the resonator 2. The active element 1 (or two combined active elements) is attached by means of the suspension or mounting or attachment element 29 to a base element 5. The driven part 53 is joined to the base element 5 via a rotary joint 51 or linear joint 52 or a rotary-linear joint. The passive element 4 is resiliently mounted with respect to the driven part 53. This can be with the link element 44—that holds the contact body 43 of the passive element 4—being itself resilient, or with an additional resilient element that connects the link 44 to the driven part 53. The pre-stress force or torque between the passive element 4 and active element 1 is exerted via the kinematic chain. The pre-stress element 6, that is the element that provides the pre-stress force or torque, can be implemented by either the attachment 29, or the link 44, or both in combination.

FIG. 10 shows an active element 1 with a bearing element 7. The bearing element 7 is shaped as part of the resonator 2. It provides an additional (third) contact between the active element 1 and the passive element 4, that is, in addition to the two contact elements 31, 32 on the arms 21, 22. Contact is made at a third contact area 45 of the contact body 43. Thereby the bearing element 7 stabilises the passive element 4 relative to the active element 1. This allows to place the contact elements 31, 32 further apart from each other and increase the diameter of the contact body 43. This in turn causes driving forces between the contact elements 31, 32 and the contact body 43 to effect a larger torque for rotating the contact body 43 around the rotary movement axis 25. Consequently, the drive unit can create a larger torque than a drive with essentially the same overall physical dimensions but without a bearing element 7.

While the invention has been described in present embodiments, it is distinctly understood that the invention is not limited thereto, but may be otherwise variously embodied and practised within the scope of the claims.

The invention claimed is:

1. A drive unit for driving a passive element relative to an active element, wherein the active element comprises:
   a resonator and at least one excitation means for exciting oscillations in the resonator,
   the resonator comprising at least two arms extending from a connection region of the resonator at a same side of the connection region,
   the resonator and the at least two arms extending in parallel to a reference plane,
   each of the at least two arms comprising, at an outer end thereof, a contact element that is movable by oscillating movements of an associated one of the at least two arms,
   the passive element being arranged to be driven and moved relative to the active element by said oscillating movements;
   the passive element comprises contact areas, each contact area being arranged to be in contact with a respective contact element;
   wherein
   a pre-stress element is arranged to exert a relative force between the active element and passive element, whereby each contact area is pressed against the respective contact element with a pre-stress force that has a component that is normal to the reference plane.

2. The drive unit of claim 1, wherein the resonator comprises a first surface and an opposed second surface, both parallel to the reference plane, and the contact areas include a first contact area and a second contact area that are arranged to come into contact only with contact edges of contact regions, the contact edges being located where the contact regions are adjacent to the first surface and the second surface, respectively.

3. The drive unit of claim 1, wherein the pre-stress element is attached to the resonator, and arranged to press against the passive element in a direction normal to the reference plane.

4. The drive unit of claim 2, wherein the active element is a first active element and the pre-stress element is formed by a further active element, said further active element being a mirror-symmetric arrangement to the first active element.

5. The drive unit of claim 4, wherein the resonators of the further active element and the active element are manufactured in one piece.

6. The drive unit of claim 1, wherein the pre-stress element is part of a suspension of the active element, or part of a suspension of the passive element, or part of both.

7. The drive unit of claim 2, wherein the passive element is arranged to rotate around a rotary movement axis, the rotary movement axis being normal to the reference plane.

8. The drive unit of claim 7, wherein the contact elements include a first contact element and a second contact element and components normal to the reference plane of the pre-stress force acting between a first contact area and the first contact element and of the pre-stress force acting between a second contact area and the second contact element are in a same direction.

9. The drive unit of claim 7, wherein each of the contact elements is rotationally symmetric with respect to a rotary movement axis, with a diameter that varies along the rotary movement axis, and the first contact area and second contact area are located at a region along the rotary movement axis where the diameter increases.

10. The drive unit of claim 4, wherein components normal to the reference plane of the pre-stress force acting between the first contact area and the first contact element and of the pre-stress force acting between the second contact area and the second contact element are in a same direction, and wherein the contact element when considered along a rotary movement axis comprises a first section where a diameter increases and which is in contact with at least two arms of the resonator of the first active element, and a second section where the diameter decreases and which is in contact with arms of a resonator of the further active element.

11. The drive unit of claim 4, wherein the passive element is arranged to rotate around a rotary-linear movement axis, the rotary-linear movement axis being essentially parallel to a resonator axis, and lying in a plane of symmetry of the mirror-symmetric arrangement of the first and further active elements.

12. The drive unit of claim 1, wherein the passive element is arranged to translate along a linear movement axis, the linear movement axis being parallel to the reference plane and parallel to a resonator axis.

13. The drive unit of claim 12, wherein the contact areas include a first contact area and second contact area and the contact elements include a first contact element and a second contact element, and wherein the pre-stress force acting between the first contact area and the first contact element and the pre-stress force acting between the second contact axis and the second contact element are parallel and in opposite directions.

14. The drive unit of claim 12, wherein the pre-stress force effects a bending of a link that extends in a direction normal to the resonator axis.

15. The drive unit of claim 12, wherein the pre-stress force effects a twisting of a link that extends in parallel to the resonator axis.

16. A drive unit for driving a passive element relative to an active element, wherein active element comprises
　　a resonator and at least one excitation means for exciting oscillations in the resonator,
　　the resonator comprising at least two arms extending from a connection region of the resonator at the same side of the connection region,
　　the resonator and at least two arms extend in parallel to a reference plane,
　　each of at least two arms comprising, at an outer end thereof, a contact element,
　　each contact element is movable by oscillating movement of an associated one of at least two arms,
　　the passive element being arranged to be driven and moved relative to the active element by said oscillating movements;
　　the passive element comprises contact areas, each contact area being arranged to be in contact with a respective contact element;
　　wherein
　　the resonator comprises a bearing element arranged to contact the contact element at a third contact area.

* * * * *